April 1, 1930.  G. R. CALL  1,752,289
VEHICLE TRAFFIC SIGNAL
Filed Jan. 31, 1929
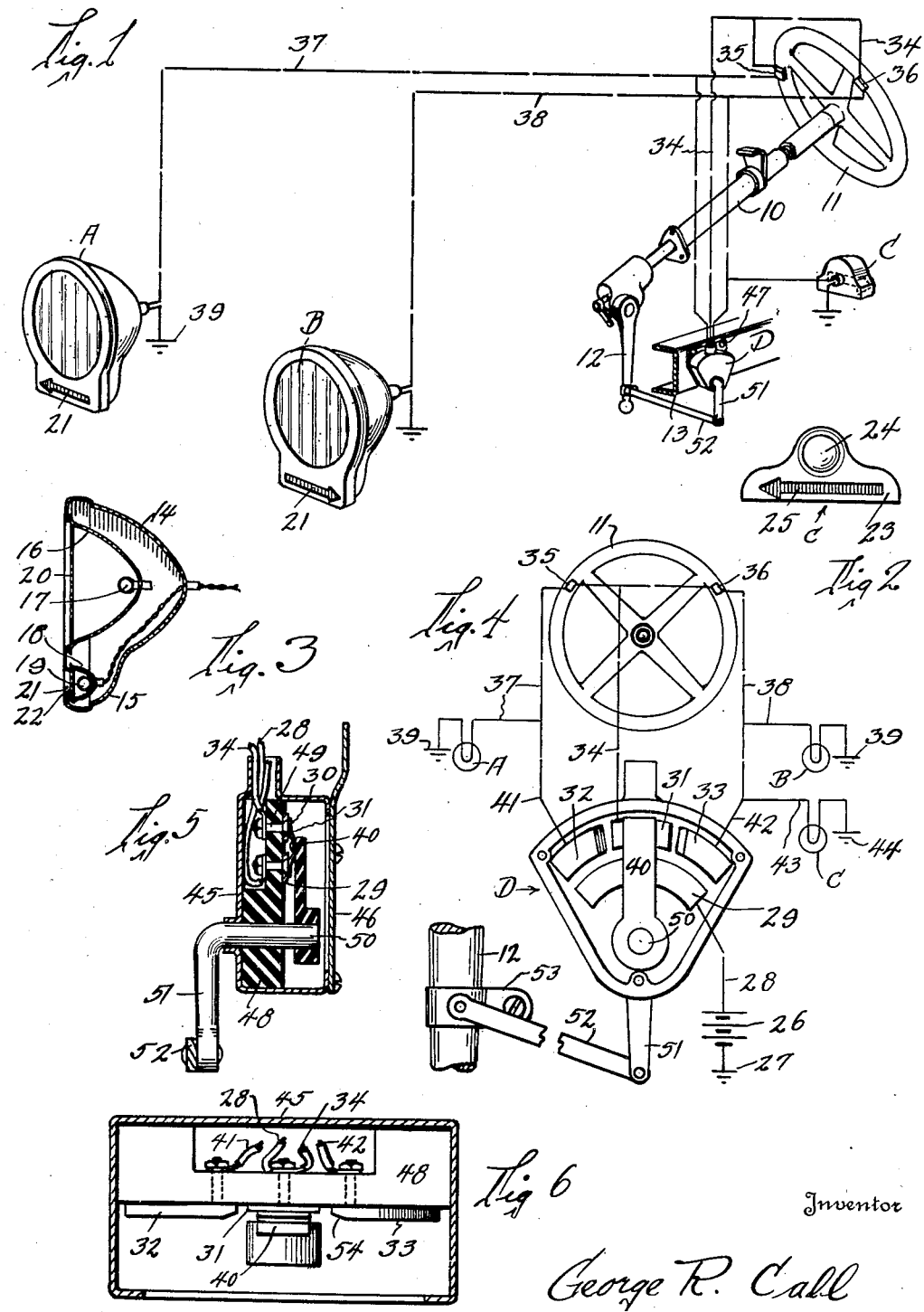
Inventor
George R. Call
By Lynn R. Latta
Attorney Patented Apr. 1, 1930

1,752,289

UNITED STATES PATENT OFFICE

GEORGE R. CALL, OF SIOUX CITY, IOWA

VEHICLE TRAFFIC SIGNAL

Application filed January 31, 1929. Serial No. 336,499.

My invention relates to a vehicle traffic signal of the type for indicating turns and it is my general object to provide a signal in which the signal device for indicating turns will be operated without conscious attention from the driver when the steering wheel is rotated for a turn.

More specifically it is my purpose to provide a vehicle traffic signal in which a signal device will first be operated by the contact of the driver's hand, a switch on the rim of the steering wheel positioned where it will be engaged by the hand of the operator reaching for a new grip on the steering wheel preparatory to rotating the wheel for a turn and in which control of the signal device is automatically taken up by a take-up switch, actuated from the steering mechanism of the vehicle after the wheel has been rotated a predetermined amount.

A further object of my invention is to arrange the switch or switches on the steering wheel rim so that any one of the fingers of the hand of the operator may readily engage the button in the natural grasping of the wheel.

Another object is to provide for cutting out the switches or switch on the steering wheel after the wheel has been rotated a predetermined amount so as to avoid the possibility of establishing a circuit through either of the steering wheel switches after they have been removed substantially from their normal positions. In explanation of this object, it may be noted that when the steering wheel has been rotated a certain amount, the hand of the operator will naturally reach for a fresh grip and the positions of the switches will be very considerably altered so that it would be possible to engage the wrong switch during the further turning of the wheel.

Another object of my invention is to provide an arrangement to accomplish the above objects and yet which is of simple, durable and inexpensive construction.

A further object of my invention is to provide an arrangement of turn lights in which an illuminated, arrow-shaped opening is positioned beneath the edge of the headlights of the vehicle to which the invention is applied, the arrow for the right headlight pointing to the right and the arrow for the left headlight pointing to the left and each arrow being illuminated through a red or amber colored lens.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Fig. 1 is a perspective view of portions of a vehicle with my invention arranged in conjunction therewith.

Fig. 2 is a rear elevation of the rear signal device.

Fig. 3 is a vertical, central, sectional view through the combination headlight and front signal device.

Fig. 4 is a view of the take-up switch with the cover removed, the remainder of the invention being shown in diagram.

Fig. 5 is a detail, vertical, sectional view through the take-up switch and

Fig. 6 is a detail, transverse, sectional view through the take-up switch.

In Fig. 1, I have used the reference character 10 to indicate generally the steering post assembly of an automobile. This steering post assembly includes the steering wheel 11 and the steering arm 12, by means of which steering movement is transferred to the front wheels of the vehicle. A portion of the frame of the vehicle is shown at 13 and the headlights are shown at A and B, respectively.

Each of the headlights A and B preferably includes as an integral part of its casing 14 a turn light casing 15, which is formed as an extension of the casing 14. At this point it may be noted that although it is preferable to include the turn light casing as an integral part of the headlight casing, it might be constructed separately and secured below the headlight casing.

The headlight reflector is shown at 16, the headlight lamp is shown at 17 and the turn light reflector and lamp are shown respectively at 18 and 19.

The headlight lens is indicated by the reference character 20 and the turn light is provided with an arrow-shaped opening 21, which is closed by a red or amber colored lens 22.

The arrow-shaped opening of the light A points to the right and the arrow-shaped opening of the light B points to the left.

The position of the turn signal lights directly below the headlights not only adds to the appearance of the vehicle but also places these lights where they are the most likely to be seen by an approaching driver. Furthermore the red or amber light is peculiarly adapted to shine in contrast to the white light of the headlights. The rear light C is shown in Fig. 3 and comprises the casing 23, the tail light 24 and a left turn light including an arrow-shaped opening 25 and substantially the same construction for illumination as is shown in Fig. 3.

The battery 26 is grounded as at 27 to the frame of the car in the usual manner and is connected by a wire 28 to a contact 29 of the take-up switch, which is indicated generally by the reference character D. From this contact 29, the current is adapted to be carried through a brush 30 to any one of the contacts 31, 32 or 33 (the particular construction of the switch, as far as mechanical details are concerned, will be more fully described hereinafter). From the central contact 31 of the take-up switch, current is carried over the wire 34 to both of the steering wheel switches 35 and 36, respectively.

When the steering wheel switch 35 is depressed, the current will be carried over the wire 37 to the lamp 19 of the light signal device A. When the switch 36 is depressed, current will be carried over the wire 38 to light the lamp 19 of the light B. The lamps 19 are grounded as at 39.

The brush 30 is carried by a swinging arm 40, which is adapted to swing over any of the contacts 31-33 inclusive, and to shift the brush from the contact 31 to either of the two side contacts. When the brush is thus shifted to the contact 32, a supplemental circuit will be established through the wires 41 and 37 to the light A and when contact is made with the element 33, the supplemental circuit will be established through the wires 42 and 38 to the light B.

The light C is connected in parallel with the light B, as by means of the wire 43 and is grounded as at 44 so that it will light simultaneously with the light B.

The switch D includes a casing 45, provided with a combined cover plate and bracket 46, adapted to be secured as at 47 to the frame 13 of the vehicle. An insulating base 48 is mounted within the casing and the contacts 29, 31, 32 and 33 are secured to the base in the usual manner as by means of bolts 49. The bolts 49 may serve as terminals to which the wires 34, 41, 42 and 28 may be secured as clearly illustrated in Fig. 5.

The swinging arm 40 is mounted on a shaft 50, journalled in the base 48 and provided with a crank arm 51, projecting from the casing. A link 52 connects the crank arm to a collar 53, which is adapted to be secured to the steering arm 12 of the steering mechanism. Movement of the steering arm will correspondingly swing the arm 40 to move the brush 30 over the contacts 31, 32, or 33.

The contacts 32 and 33 are so spaced that approximately a quarter turn of the steering wheel will be sufficient to bring the brush into contact with one of the side contacts 32 or 33. These contacts are raised above the plane of the contact 31 and are provided with bevelled faces 54 (Fig. 6) adapted to lift the brush 30 away from contact with the element 31. Thus the switches 35 and 36 will be cut out immediately upon establishment of either of the supplemental circuits so that accidental engagement of the wrong switch during further turning of the steering wheel will not cause the wrong light to be illuminated.

Although the switch D is shown as being operatively connected with the steering arm 12, it will be understood that the same result might be accomplished by connecting the switch to the drag link or some other portion of the steering mechanism between the arm 12 and the steerable front wheels of the vehicle. Accordingly, my invention is intended to embrace the controlling of the take-up switch from any portion of the steering mechanism between the front wheels and the arm 12, where the words "means for transmitting steering movement" are used in the claims.

I am aware that it is not new to arrange a switch to be operated from the steering mechanism of a vehicle for the purpose of controlling a turn light and that it is not new to provide hand switches for a steering wheel positioned to be actuated by the hand of the driver in reaching for a new grip on the wheel to make a turn.

However, the use of a steering mechanism control switch has the disadvantage of being slow in operation since the wheel must be turned a substantial distance before such a switch will operate. On the other hand, the steering wheel switch is objectionable in that the hand of the operator will very often release the switch before the turn signal should be released. In my invention, the turn light is illuminated when the driver first grasps the wheel preparatory to making a turn and continues to be illuminated until after the turn has been completely made. My invention therefore resides basically in the arrangement for the initial lighting of the signal lamp by a steering wheel switch, positioned to be engaged without conscious attention upon the part of the driver together with means for automatically taking up the control of the lights after the wheel has been turned a predetermined amount.

Another feature that may be noted about the arrangement of the hand switches, according to my invention, is that they are placed at the underside of the cross sectional area of the rim of the steering wheel. By arranging the switches in this manner, they are in position to be naturally grasped by any one of the fingers of the operator. Thus, if one of the fingers should miss the button, another finger is likely to engage it.

Some changes may be made in the construction and arrangement of the parts of my invention without departing from the real spirit and purpose of my invention, and it is my intention to cover by my claims, any modified forms of structure or use of mechanical equivalents, which may be reasonably included within their scope.

I claim as my invention:

1. A vehicle traffic signal including, in combination with the steering wheel of said vehicle and means for transmitting motion of said wheel to the travel wheels of the vehicle, a hand switch adapted to be operated in advance of the turning of the steering wheel and normally biased in open position, a signal device to indicate a turn, a circuit including said hand switch and the signal device, a source of current, a take-up switch operably connected with said means for transmitting, and adapted to establish a supplemental circuit from the source of current to the signal device, after the steering wheel has been rotated a predetermined amount, said take-up switch including a brush connected to the source of current, a central contact connected to the steering wheel switches to carry current thereto upon contact with the brush, and a side contact arranged adjacent the central contact, to carry current to the supplemental circuit upon contact with the brush.

2. A vehicle traffic signal including, in combination with the steering wheel of said vehicle and means for transmitting the motion of said wheel to the travel wheels of the vehicle, a hand switch adapted to be operated in advance of the turning of the steering wheel and normally biased in open position, a signal device to indicate a turn, a circuit including said hand switch and the signal device, a source of current, a take-up switch operably connected with said means for transmitting, and adapted to establish a supplemental circuit from the source of current to the signal device after the steering wheel has been rotated a predetermined amount, said take-up switch including a pair of contacts, included in the hand switch circuit, one of said contacts being adapted to move as the switch moves to establish said supplemental circuit, to separate said contacts and break the hand switch circuit.

3. A vehicle traffic signal including, in combination with the steering wheel of said vehicle and means for transmitting the motion of said wheel to the travel wheels of the vehicle, a hand switch adapted to be operated in advance of the turning of the steering wheel and normally biased in open position, a signal device to indicate a turn, a circuit including said hand switch and the signal device, a source of current, a take-up switch operably connected with said means for transmitting, and adapted to establish a supplemental circuit from the source of current to the signal device after the steering wheel has been rotated a predetermined amount, said take-up switch forming part of the hand switch circuit in such a manner that the hand switch is operable only when the steering wheel is in a neutral position.

4. A vehicle traffic signal including, in combination with the steering wheel of said vehicle and means for transmitting the motion of said wheel to the travel wheels of the vehicle, a hand switch adapted to be operated in advance of the turning of the steering wheel and normally biased in open position, a signal device to indicate a turn, a circuit including said hand switch and the signal device, a source of current, a take-up switch adapted to establish a supplemental circuit from the source of current to the signal device, after the steering wheel has been rotated a predetermined amount, said take-up switch operatively connected with said means for transmitting and forming a part of the hand switch circuit in such a manner as to disconnect the hand switch from the signal device after the establishing of the supplemental circuit.

5. A vehicle traffic signal including, in combination with the steering wheel of said vehicle and a steering arm for transmitting the motion of said wheel to the travel wheels of the vehicle, a hand switch adapted to be operated in advance of the turning of the steering wheel and normally biased in open position, a signal device to indicate a turn, a circuit including said hand switch and the signal device, a source of current, a take-up switch adapted to establish a supplemental circuit from the source of current to the signal device, after the steering wheel has been rotated a predetermined amount said take-up switch being operatively connected with said steering arm and being included in the hand switch circuit in such a manner as to disconnect the hand switch from the signalling device after the establishing of the supplemental circuit.

Signed this 26 day of January, 1929, in the county of Woodbury and State of Iowa.

GEORGE R. CALL.